(12) United States Patent
Yamasaki et al.

(10) Patent No.: US 9,597,695 B2
(45) Date of Patent: Mar. 21, 2017

(54) ELECTROSTATIC COATING APPARATUS AND ELECTRIC CONDUCTIVITY CHECK METHOD

(71) Applicant: TOYOTA JIDOSHA KABUSHIKI KAISHA, Toyota-shi, Aichi-ken (JP)

(72) Inventors: Isamu Yamasaki, Toyota (JP); Kimiyoshi Nagai, Yokohama (JP); Ryuta Ishikura, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/979,137

(22) Filed: Dec. 22, 2015

(65) Prior Publication Data

US 2016/0199859 A1 Jul. 14, 2016

(30) Foreign Application Priority Data

Jan. 9, 2015 (JP) .................................. 2015-002975

(51) Int. Cl.
| | |
|---|---|
| *B05B 5/025* | (2006.01) |
| *B05B 12/08* | (2006.01) |
| *B05D 1/04* | (2006.01) |
| *B05B 5/04* | (2006.01) |
| *B05B 5/053* | (2006.01) |
| *H02B 1/16* | (2006.01) |

(52) U.S. Cl.
CPC ................ *B05B 5/025* (2013.01); *B05B 5/04* (2013.01); *B05B 5/0531* (2013.01); *B05B 12/08* (2013.01); *B05D 1/04* (2013.01); *H02B 1/16* (2013.01)

(58) Field of Classification Search
CPC .............. B05B 5/025; B05B 5/04; B05D 1/04
See application file for complete search history.

(56) References Cited

U.S. PATENT DOCUMENTS 3,970,920 A * 7/1976 Braun ..................... B05B 5/087
324/455
6,068,877 A * 5/2000 Seitz ..................... B05B 5/0531
427/477

FOREIGN PATENT DOCUMENTS

| JP | 2012-071224 A | 4/2012 |
|---|---|---|
| JP | 2014-079701 A | 5/2014 |
| JP | 2014-079704 A | 5/2014 |
| WO | 2012/042340 A1 | 4/2012 |

* cited by examiner

Primary Examiner — Xiao Zhao
(74) *Attorney, Agent, or Firm* — Oliff PLC

(57) ABSTRACT

An electrostatic coating apparatus includes a coating gun that sprays a coating material toward a coated matter, a high-voltage application apparatus that applies a high voltage to the coating gun, a bell-side current calculation unit that calculates a bell-side current to flow from the coating gun to the coated matter, an earth-side current measurement unit that measures an earth-side current to flow from the coated matter to the earth, and an earth check unit that detects an abnormal earth state of the coated matter, depending on a magnitude relation between the bell-side current calculated at the time of electrostatic coating and the bell-side current when the earth is properly connected, and a magnitude relation between the earth-side current measured at the time of the electrostatic coating and the earth-side current when the earth is properly connected.

4 Claims, 5 Drawing Sheets

FIG. 5

|  | EARTH CONDUCTION STATE | EARTH ISOLATION STATE |
|---|---|---|
| BELL-SIDE CURRENT i1 | 27.8 | 13 |
| EARTH-SIDE CURRENT i2 | 25 | 7.6 |
| CURRENT RATIO i2/i1 | 90% | 58% |

ELECTROSTATIC COATING APPARATUS AND ELECTRIC CONDUCTIVITY CHECK METHOD

INCORPORATION BY REFERENCE

The disclosure of Japanese Patent Application No. 2015-002975 filed on Jan. 9, 2015 including the specification, drawings and abstract is incorporated herein by reference in its entirety.

BACKGROUND OF THE INVENTION

1. Field of the Invention

The invention relates to an electrostatic coating apparatus and an electric conductivity check method therein, and for example, relates to an electrostatic coating apparatus that requires the confirmation of the electric conductivity of a coated matter after the coated matter is coated with electrically conductive primer, and an electric conductivity check method therein.

2. Description of Related Art

As a method for performing the coating of a coated matter, there is an electrostatic coating. In the electrostatic coating, a high voltage is applied to a coating gun or the like, and an electric field is generated between the coating gun and the coated matter. Then, in the electrostatic coating, a coating material electrified by the high voltage is sprayed from the coating gun to the coated matter, and thereby, the coating of the coated matter is performed. On this occasion, in the case where the coated matter is a component with a low electric conductivity such as a resin component, electrically conductive primer is applied on a coated surface of the coated matter, and after the electric conductivity is secured, the electrostatic coating is performed. In the case where the electrically conductive primer is applied on the coated matter in advance in this way, it is necessary to confirm that the electric conductivity is secured, after the electrically conductive primer is applied. The confirmation of the electric conductivity is performed by confirming whether the coated matter is earthed. Hence, Japanese Patent Application Publication No. 2012-071224 discloses an exemplary technology for confirming the earth state of the coated matter.

An electrostatic coating apparatus described in JP 2012-071224 A includes a coating gun that sprays a coating material to a coated matter, a robot arm that supports the coating gun such that the coating gun can be displaced, a high-voltage generation apparatus that generates a high voltage to be applied to the coating gun and that regulates the generated high voltage by detecting the discharge current generated between the coating gun and the coated matter. Then, the electrostatic coating apparatus in JP 2012-071224 A electrifies the coated matter with electric charge by forming an electric filed from the coating gun toward the coated matter, when the coating gun does not spray the coating material toward the coated matter, and detects the discharge current generated between the coating gun and the coated matter, by the electric charge of the electrified coated matter, when the high-voltage generation apparatus does not apply the high voltage to the coating gun.

However, in the technology described in JP 2012-071224 A, it is necessary to provide a process for confirming the earth state, separately from the electrostatic coating process. That is, in the technology described in JP 2012-071224 A, the coating process includes the process for confirming the earth state, causing a problem in that the total time for the coating process is long.

SUMMARY OF THE INVENTION

The invention shortens the time for the coating process.

A first aspect of the invention relates to an electrostatic coating apparatus including: a coating gun that sprays a coating material toward a coated matter; a high-voltage application apparatus that includes a bell-side current calculation unit and that applies a high voltage to the coating gun, the bell-side current calculation unit calculating a bell-side current flowing from the coating gun to the coated matter; an earth-side current measurement unit that measures an earth-side current flowing from the coated matter to the earth; and an earth check unit that detects an abnormal earth state of the coated matter, depending on a magnitude relation between the bell-side current calculated at the time of electrostatic coating and the bell-side current when the earth is properly connected, and a magnitude relation between the earth-side current measured at the time of the electrostatic coating and the earth-side current when the earth is properly connected.

A second aspect of the invention relates to an electric conductivity check method in an electrostatic coating apparatus, the electrostatic coating apparatus including: a coating gun that sprays a coating material toward a coated matter; a high-voltage application apparatus that includes a bell-side current calculation unit and that applies a high voltage to the coating gun, the bell-side current calculation unit calculating a bell-side current flowing from the coating gun to the coated matter; and an earth-side current measurement unit that measures an earth-side current flowing from the coated matter to the earth. The method includes: calculating the bell-side current as a first measurement value and measuring the earth-side current as a second measurement value at the time of electrostatic coating; and detecting an abnormal earth state of the coated matter, depending on a magnitude relation between the calculated first measurement value and the bell-side current when the earth is properly connected, and a magnitude relation between the measured second measurement value and the earth-side current when the earth is properly connected.

In the electrostatic coating apparatus and electric conductivity check method according to the invention, when the coating material is sprayed to the coated matter in the electrostatic coating process, it is possible to confirm whether the earth for the coated matter is poor, simultaneously with the spraying of the coating material.

In the electrostatic coating apparatus and electric conductivity check method according to the invention, the electrostatic coating process includes the earth confirmation process, and thereby, it is possible to omit the earth confirmation process.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a table for describing differences in a bell-side current and an earth-side current due to the state of the earth, in the electrostatic coating apparatus according to the first embodiment.

DETAILED DESCRIPTION OF EMBODIMENTS

Figure 1:
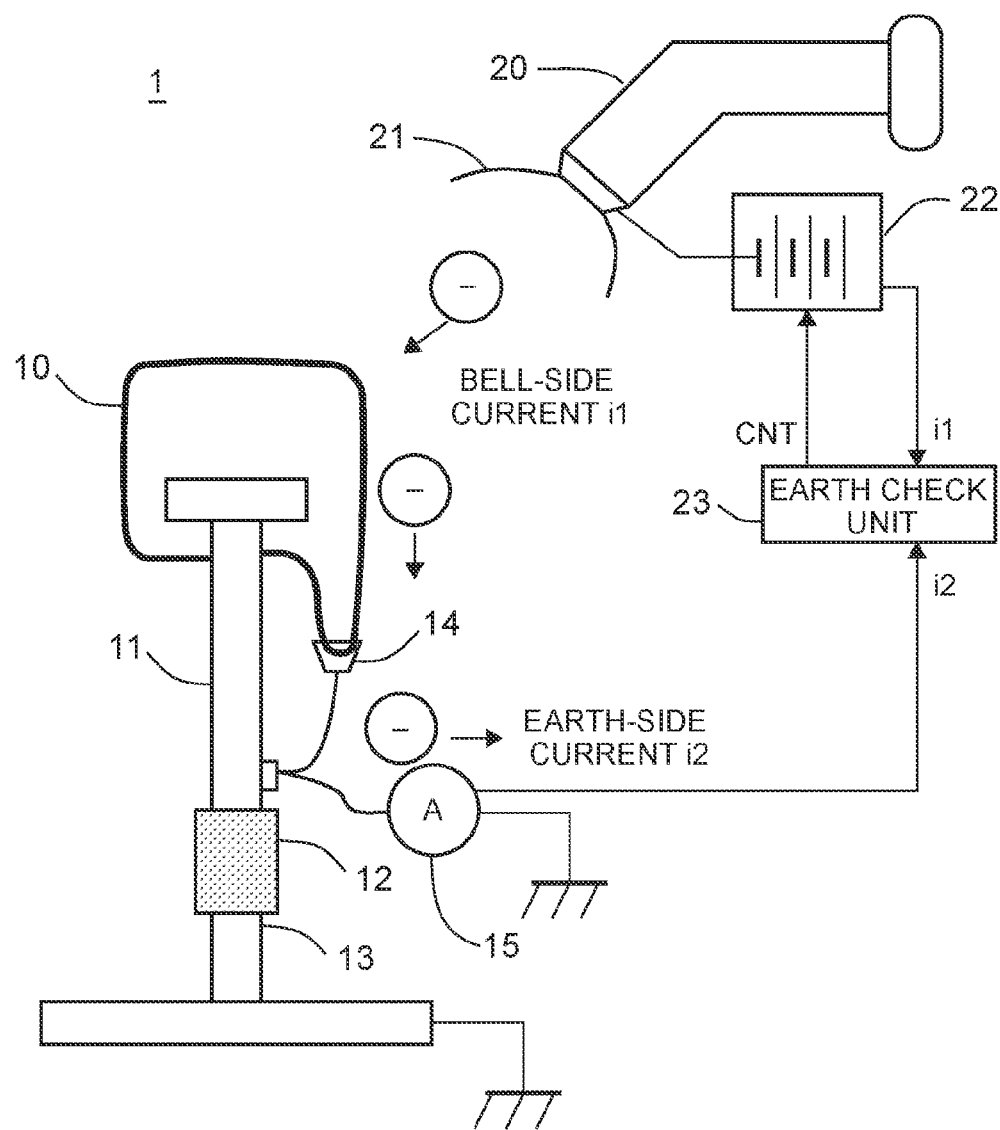
FIG. 1 is a block diagram of an electrostatic coating apparatus according to the first embodiment.

Hereinafter, an embodiment of the invention will be described with reference to the drawings. For a clear explanation, the following descriptions and drawings are appropriately omitted and simplified. In the drawings, for identical elements, identical reference numerals are assigned, and repetitive descriptions are omitted as necessary.

FIG. 1 shows a block diagram of an electrostatic coating apparatus 1 according to the first embodiment. The electrostatic coating apparatus 1 is an apparatus that performs the coating of a coated matter 10 using a coating gun 20. As shown in FIG. 1, the electrostatic coating apparatus 1 includes a coated matter fixture 11, an insulator 12, a seat part 13, an earth electrode 14, an earth-side current measurement unit (for example, an ammeter 15), the coating gun 20, a high-voltage application apparatus 22, and an earth check unit 23.

The coated matter fixture 11 fixes the coated matter 10. The coated matter fixture 11 fixes the seat part 13 through the insulator 12. The insulator 12 insulates the coated matter fixture 11 and the seat part 13. The seat part 13 is electrically earthed. Further, the coated matter fixture 11 has the earth electrode 14 linked through an electrically conductive wire. The earth electrode 14, which is connected with the coated matter 10, connects the coated matter 10 with the earth. The earth electrode 14 is earthed through the ammeter 15. Further, the coated matter fixture 11 is connected with the earth electrode. The ammeter 15 detects (measures) a current to flow from the coated matter 10 to the earth, as an earth-side current i2.

The coating gun 20 sprays a coating material 21 from a spray part (bell cup). To the coating gun 20, a high voltage is applied from the high-voltage application apparatus 22. By the high voltage, the coating gun 20 generates an electric field between the coating gun 20 and the coated matter 10, and electrifies the coating material. The high-voltage application apparatus 22 generates the high voltage to be applied to the coating gun 20, and calculates a bell-side current i1 to flow from the coating gun 20 to the coated matter 10.

The earth check unit 23 detects an abnormality of the earth state of the coated matter 10, based on the bell-side current i1 and the earth-side current i2. Here, in the embodiment, in the case of determining that the earth state of the coated matter 10 is abnormal, the earth check unit 23 enables a control signal CNT that makes the high-voltage application apparatus 22 stop the generation of the high voltage to be output. The detail of an electric conductivity check method for the coated matter 10 in the earth check unit 23 will described later.

Figure 2:
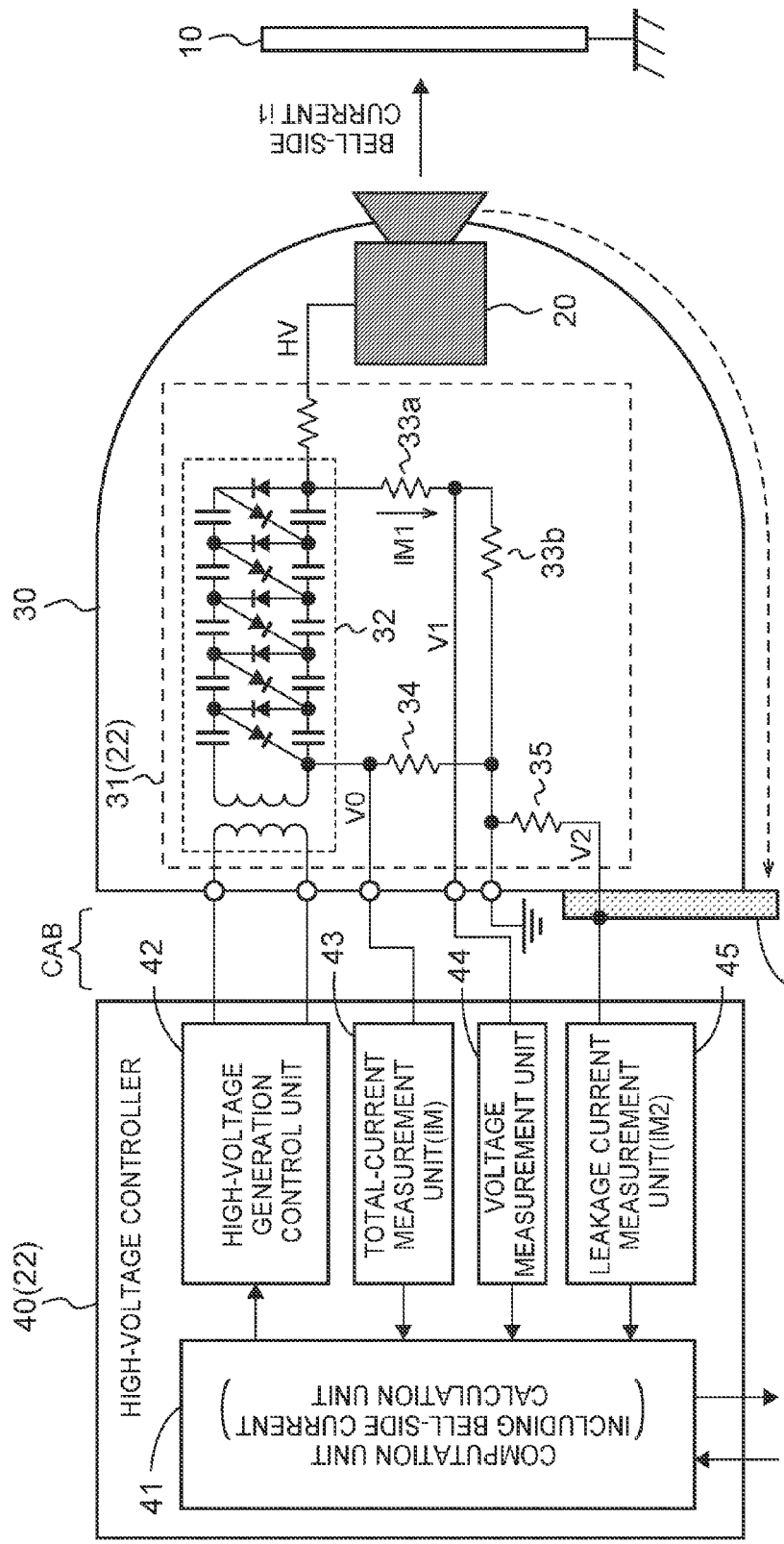
FIG. 2 is a block diagram of a bell coating machine and a high-voltage application apparatus according to the first embodiment.

Here, the coating gun 20 and the high-voltage application apparatus 22 will be described in more detail. FIG. 2 shows a block diagram of a bell coating machine and the high-voltage application apparatus according to the first embodiment. As shown in FIG. 2, the coating gun 20 is a part of a bell coating machine 30. Further, the high-voltage application apparatus 22 is constituted by a high-voltage generator 31 in the bell coating machine 30 and a high-voltage controller 40. Then, the bell coating machine 30 and the high-voltage controller 40 are connected, for example, by six to eight core cable CAB.

The bell coating machine 30 includes the high-voltage generator 31 in addition to the coating gun 20. Further, in the bell coating machine 30, a leakage current detection unit 36 is provided. The high-voltage generator 31 includes a booster circuit 32, high-voltage measurement resistances 33a, 33b, a total-current measurement resistance 34, and a leakage current measurement resistance 35. The booster circuit 32 boosts an input voltage given from the high-voltage controller 40, by a drive pulse, and generates a high voltage HV to be given to the coating gun 20. As the booster circuit 32, for example, a Cockcroft-Walton booster circuit (CW circuit) can be used. Further, in the booster circuit 32, a transformer is provided, and the total-current measurement resistance 34 is provided between one end of the secondary coil of the transformer and a grounding wire to which a grounding voltage is supplied. Then, a voltage V0 is generated at the terminal on the high-voltage generator 31 side of the total-current measurement resistance 34. The voltage V0 is divided by the resistance value of the total-current measurement resistance 34, and thereby, a total current IM can be calculated.

Further, the high-voltage measurement resistance 33a and the high-voltage measurement resistance 33b are connected in series, between an output terminal of the high-voltage generator 31 and the grounding wire. A voltage V1 at the connection point between the high-voltage measurement resistance 33a and the high-voltage measurement resistance 33b is a voltage resulting from the voltage division of the high voltage HV output from the high-voltage generator 31 by the high-voltage measurement resistance 33a and the high-voltage measurement resistance 33b. Here, the high-voltage measurement resistance 33a and the high-voltage measurement resistance 33b have already-known resistance values, and therefore, the voltage value of the high voltage HV can be calculated from the voltage V1. Further, a bleeder current IM1 flows through the high-voltage measurement resistance 33a and the high-voltage measurement resistance 33b. The bleeder current IM1 can be also calculated by the division of the high voltage HV by the sum of the resistance values of the high-voltage measurement resistance 33a and the high-voltage measurement resistance 33b.

Further, on the bell coating machine 30, a rear-plate-side leakage current IM2 flows in association with the dirt of the outer surface of the bell coating machine 30. Hence, the bell coating machine 30 detects the rear-plate-side leakage current IM2 with the leakage current detection unit 36. Specifically, the leakage current measurement resistance 35 is provided between the leakage current detection unit 36 and the grounding wire. Therefore, the rear-plate-side leakage current IM2 flowing through the leakage current detection unit 36 flows to the grounding wire through the leakage current measurement resistance 35. Thereby, a voltage V2 is generated at the leakage current detection unit 36 side of the leakage current measurement resistance 35. Hence, the rear-plate-side leakage current IM2 can be calculated by the division of the voltage V2 by the resistance value of the leakage current measurement resistance 35.

The high-voltage controller 40 includes a computation unit 41, a high-voltage generation control unit 42, a total-current measurement unit 43, a voltage measurement unit 44, and a leakage current measurement unit 45. The high-voltage generation control unit 42 generates the input voltage and drive pulse to be given to the high-voltage generator 31. Here, the high-voltage generation control unit 42 changes the voltage level of the input voltage, the duty ratio of the drive pulse, and the like, in response to an instruction from the computation unit 41. The total-current measurement unit 43 acquires the voltage V0, calculates the total current IM based on the acquired voltage V0, and outputs the value of the calculated total current IM to the computation unit 41. The voltage measurement unit 44 measures the voltage V1, and outputs the measured voltage value to the computation unit 41. The leakage current measurement unit 45 acquires the voltage V2, calculates the rear-plate-side leakage current IM2 based on the acquired voltage V2, and outputs the value of the calculated rear-plate-side leakage current IM2 to the computation unit 41.

The computation unit 41 calculates the voltage value of the high voltage HV based on the voltage V1 acquired from the voltage measurement unit 44, and controls the high-voltage generation control unit 42 based on the value of the calculated high voltage HV. Further, the computation unit 41 has a function to stop the output of the high voltage HV by stopping the operation of the high-voltage generation control unit 42 in response to the control signal CNT given from the earth check unit 23. Further, the computation unit 41 includes a bell-side current calculation unit. The bell-side current calculation unit calculates a bell-side current i1, based on the total current IM acquired from the total-current measurement unit 43, the bleeder current IM1 calculated based on the voltage V1 acquired from the voltage measurement unit 44, and the rear-plate-side leakage current IM2 acquired from the leakage current measurement unit 45. Then, the computation unit 41 outputs the calculated bell-side current i1 to the earth check unit 23.

Here, a calculation method for the bell-side current i1 will be described. The bell-side current calculation unit included in the computation unit 41 calculates the bell-side current i1 based on Formula (1).

$$i1 = IM - IM1 - IM2 \quad (1)$$

In Formula (1), the total current IM and the rear-plate-side leakage current IM2 are measurement values. On the other hand, the bleeder current IM1 is a calculation value that is calculated from the high voltage HV output by the booster circuit 32 and the resistance values of the high-voltage measurement resistance 33a and the high-voltage measurement resistance 33b.

Here, in the electrostatic coating apparatus 1 according to the first embodiment, the value resulting from subtracting the bleeder current IM1 from the total current IM is referred to as a theoretical output current value.

Figure 3:
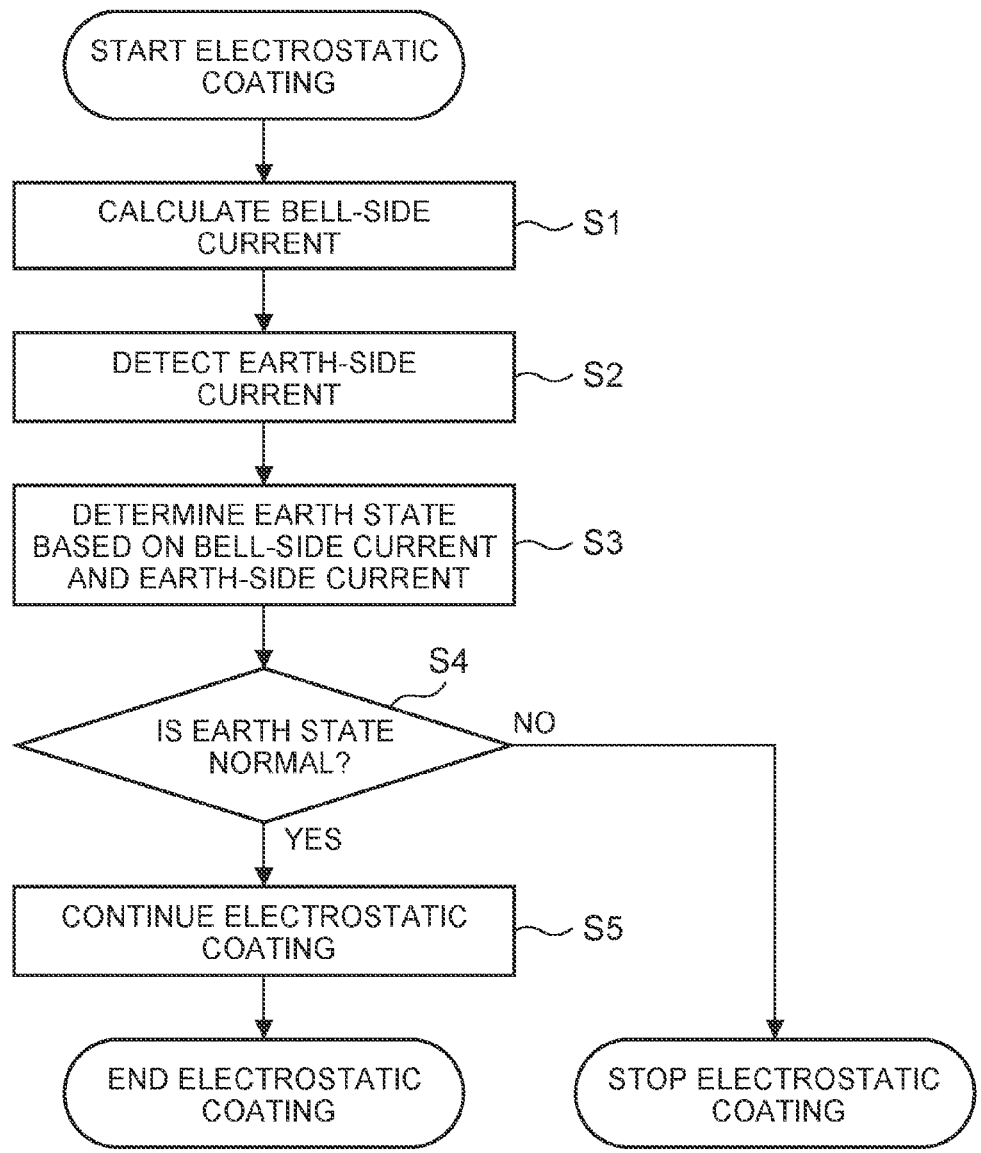
FIG. 3 is a flowchart for describing the operation of the electrostatic coating apparatus according to the first embodiment.

Next, the operation of the electrostatic coating apparatus 1 according to the first embodiment will be described. FIG. 3 shows a flowchart for describing the operation of the electrostatic coating apparatus 1 according to the first embodiment. As shown in FIG. 3, the electrostatic coating apparatus 1 according to the first embodiment performs the check of the electric conductivity of the coated matter 10 while performing the electrostatic coating.

The electrostatic coating apparatus 1 calculates the bell-side current i1 when the coating gun 20 sprays the electrified coating material 21 to the coated matter 10 (step S1). Further, the electrostatic coating apparatus 1 detects, with the ammeter 15, the earth-side current i2 to flow from the coated matter 10 to the earth during the electrostatic coating (step S2). Then, the electrostatic coating apparatus 1 determines the earth state of the coated matter 10, based on the bell-side current i1 and the earth-side current i2 (step S3).

Figure 4:
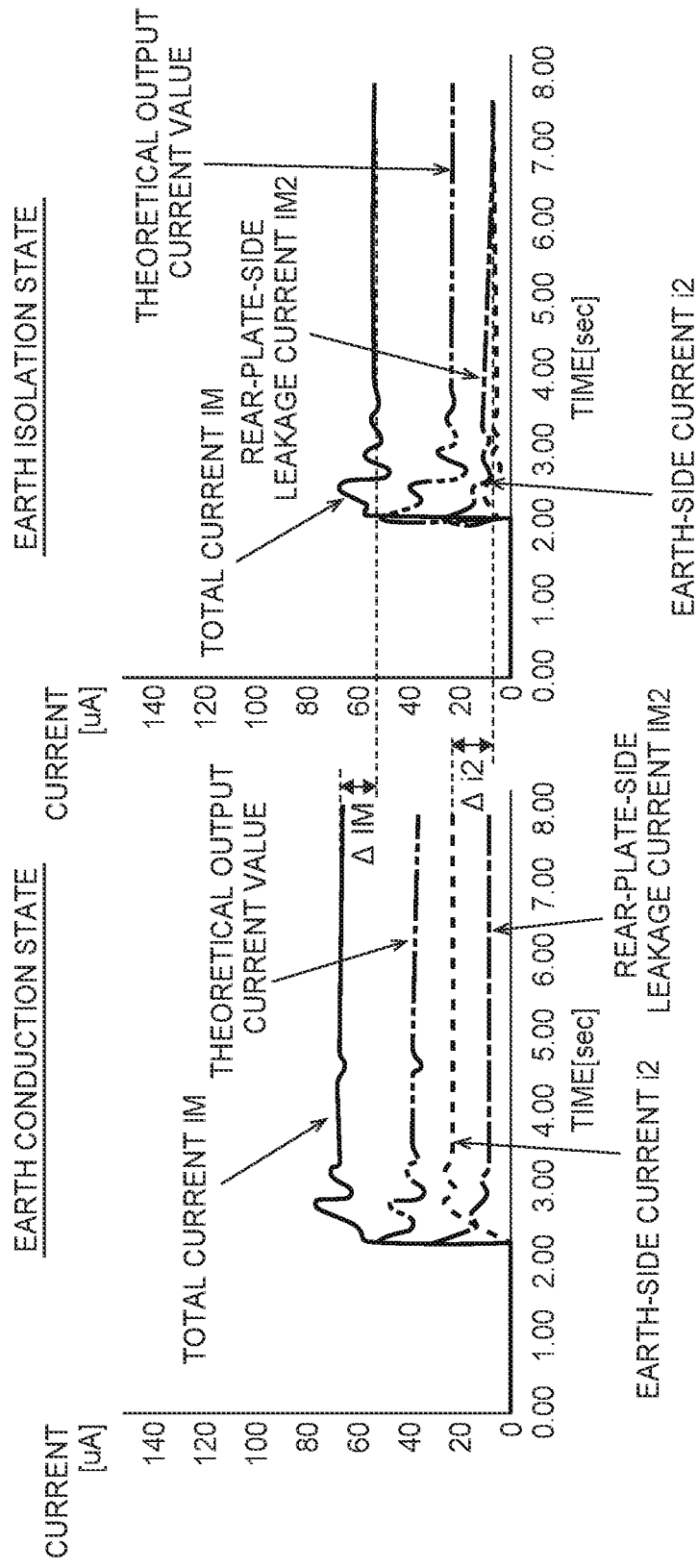
FIG. 4 is a graph for describing a change in current value in the electrostatic coating apparatus according to the first embodiment.

Here, a determination method for the earth state in the electrostatic coating apparatus 1 will be described. In the electrostatic coating apparatus 1, there are large differences in the bell-side current i1 and the earth-side current i2, between a case where the earth for the coated matter 10 acts properly (hereinafter, referred to as an earth conduction state) and an abnormal state in which the earth does not act properly (hereinafter, referred to as an earth isolation state). FIG. 4 shows a graph for describing a change in current value in the electrostatic coating apparatus 1 according to Embodiment 1. In FIG. 4, a current change in the earth conduction state of the electrostatic coating apparatus 1 is shown on the left side, and a current change in the earth isolation state of the electrostatic coating apparatus 1 is shown on the right side. As shown in FIG. 4, there are large differences in the total current IM and the earth-side current i2 depending on whether the earth acts.

Further, FIG. 5 shows a table in which the bell-side current i1 and the earth-side current i2 are compared between the earth conduction state and the earth isolation state. In the example shown in FIG. 5, in the bell-side current i1, there is a difference of about two times depending on the state of the earth. In the earth-side current, there is a difference of three times or more. Even in the case of comparing the ratio of the bell-side current i1 and the earth-side current, there is a difference of 32% depending on whether the earth acts.

Because of the differences in the currents shown in FIG. 4 and FIG. 5, the earth check unit 23 of the electrostatic coating apparatus 1 according to the first embodiment determines the abnormality of the earth by any method of a first determination method and a second determination method.

In the first determination method, the bell-side current i1 and earth-side current i2 when the earth acts normally are previously set as first and second standard values, respectively. Then, in the first determination method, when any one of the difference between the calculated bell-side current i1 and the first standard value and the difference between the measured earth-side current i2 and the second standard value becomes a previously decided threshold or more, it is determined that the earth abnormality has occurred.

In the second determination method, a ratio (for example, i2/i1) of the bell-side current i1 and earth-side current i2 when the earth acts normally is previously set as a standard value. Then, in the second determination method, when the difference between the ratio of the calculated bell-side current i1 and the measured earth-side current i2 and the standard value becomes a previously decided threshold or more, it is determined that the earth abnormality has occurred.

In the first determination method, it is necessary to know the current value at the normal time and set the threshold. Further, the current value at the normal time varies depending on the difference in coating condition, coated matter or the like, and therefore, in the first determination method, it is necessary to set the threshold for each coating condition or each coated matter. On the other hand, in the second determination method, the determination of the earth state is made based on the ratio of the bell-side current i1 and the measured earth-side current i2. Therefore, in the second determination method, even when there is a difference in coating condition, coated matter or the like, the ratio does not vary largely. Therefore, in the second determination method, a fixed threshold can be set regardless of the difference in coating condition, coated matter or the like.

Then, as shown in FIG. 3, in the case of detecting the abnormality of the earth state of the coated matter 10 based on the above determination method, the electrostatic coating apparatus 1 according to the first embodiment enables the control signal CNT to be output from the earth check unit 23, and stops the electrostatic coating (NO in step S4). On the other hand, in the case of determining that the earth state of the coated matter 10 is not abnormal based on the above determination method (YES in step S4), the electrostatic coating apparatus 1 according to the first embodiment continues the electrostatic coating (step S5), and completes the electrostatic coating.

As described above, in the electrostatic coating apparatus 1 and the electric conductivity check method therein according to the first embodiment, it is possible to detect the abnormality of the earth state of the coated matter 10 during the electrostatic coating process, based on the currents that flow in the electrostatic coating apparatus 1. Thereby, in the electrostatic coating apparatus 1 and the electric conductivity check method therein according to the first embodiment, it is unnecessary to separately provide a process for checking the earth state of the coated matter 10, and therefore, it is possible to shorten the time for the coating process.

In the above description, the invention made by the inventor has been specifically described based on the embodiment, but the invention is not limited to the already-described embodiment.

What is claimed is:

1. An electrostatic coating apparatus comprising:
a coating gun that sprays a coating material toward a coated matter;
a high-voltage application apparatus that includes a bell-side current calculation unit and that applies a high voltage to the coating gun, the bell-side current calculation unit calculating a bell-side current flowing from the coating gun to the coated matter;
an earth-side current measurement unit that measures an earth-side current flowing from the coated matter to the earth; and
an earth check unit that detects an abnormal earth state of the coated matter, depending on a magnitude relation between the bell-side current calculated at the time of electrostatic coating and the bell-side current when the earth is properly connected, and a magnitude relation between the earth-side current measured at the time of the electrostatic coating and the earth-side current when the earth is properly connected.

2. The electrostatic coating apparatus according to claim 1, wherein
the earth check unit detects the abnormal earth state of the coated matter, based on a difference between a ratio of the bell-side current and the earth-side current measured at the time of the electrostatic coating and a standard value that is set based on a ratio of the bell-side current and the earth-side current when the earth is properly connected.

3. An electric conductivity check method in an electrostatic coating apparatus, the electrostatic coating apparatus comprising: a coating gun that sprays a coating material toward a coated matter; a high-voltage application apparatus that includes a bell-side current calculation unit and that applies a high voltage to the coating gun, the bell-side current calculation unit calculating a bell-side current flowing from the coating gun to the coated matter; and an earth-side current measurement unit that measures an earth-side current flowing from the coated matter to the earth,
the electric conductivity check method comprising:
calculating the bell-side current as a first measurement value and measuring the earth-side current as a second measurement value at the time of electrostatic coating; and
detecting an abnormal earth state of the coated matter, depending on a magnitude relation between the calculated first measurement value and the bell-side current when the earth is properly connected, and a magnitude relation between the measured second measurement value and the earth-side current when the earth is properly connected.

4. The electric conductivity check method according to claim 3, wherein
the abnormal earth state of the coated matter is detected based on a difference between a ratio of the bell-side current calculated at the time of the electrostatic coating and the earth-side current measured at the time of the electrostatic coating and a standard value that is set based on a ratio of the bell-side current and the earth-side current when the earth is properly connected.

* * * * *